J. M. Drake,
Pulley Block.
N° 37,859.　　　　Patented Mar. 10, 1863.
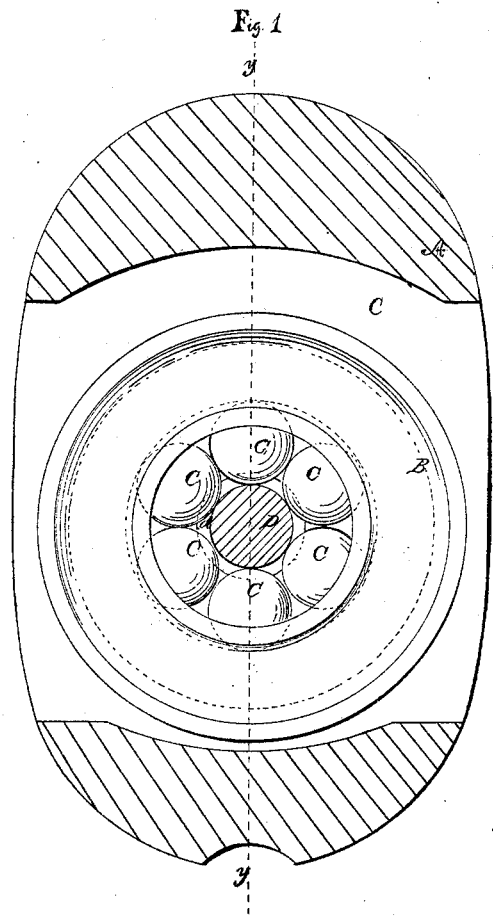
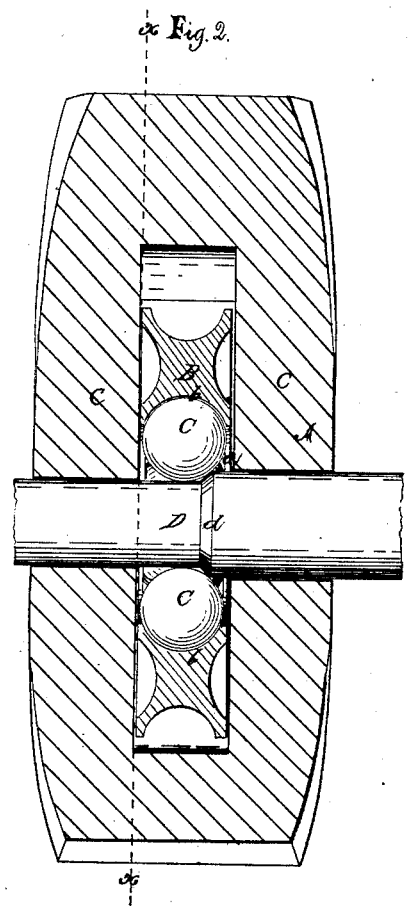
Witnesses
R. L. Gawley
Timothy Shine
Inventor
Joseph M. Drake

UNITED STATES PATENT OFFICE.

JOSEPH M. DRAKE, OF AMITYVILLE, NEW YORK.

IMPROVED PULLEY-BLOCK.

Specification forming part of Letters Patent No. 37,859, dated March 10, 1863.

*To all whom it may concern:*

Be it known that I, JOSEPH M. DRAKE, of Amityville, in the county of Suffolk and State of New York, have invented a new and useful Improvement in Pulley-Blocks; and I do hereby declare that the following is a full, clear, and exact description of the same, reference being had to the accompanying drawings, making a part of this specification, in which—

Figure 1 is a section of my invention, taken in the line $x\ x$, Fig. 2; Fig. 2, a section of the same, taken in the line $y\ y$, Fig. 1.

Similar letters of reference indicate corresponding parts in the two figures.

To enable those skilled in the art to fully understand and construct my invention, I will proceed to describe it.

A represents the block in which the pulley or wheel B is placed. This block may be constructed of wood in the usual or in any proper manner. The pulley or wheel B may be either of wood or metal—in the drawings it is represented as being of metal—and it has a grooved periphery to receive the rope which passes over it. At the center of the pulley or wheel, and concentric with its periphery, there is made a circular opening, $a$, and the inner periphery of the pulley or wheel around this opening $a$ is grooved or made of concave form, it being a semicircle in its transverse section, as shown clearly at $b$ in Fig. 2. In this groove $b$ there are placed a series of metal balls, C, of such a diameter that they will fit snugly in the groove $b$, and still be allowed to rotate freely in it.

D is the axis of wheel which passes through the cheeks $c\ c$ of the block and through the space at the center of the circle formed by the balls, as shown clearly in Fig. 1. The balls C rest or bear on the axis D, the latter being stationary. The axis is provided with a shoulder, $d$, which bears against the inner parts of the balls at one side and prevents the axis moving longitudinally in one direction, a key or head preventing the movement of the axis in the opposite direction. By this arrangement it will be seen that when the pulley or wheel B is rotated the balls C, which are interposed between the axis D and the pulley or wheel, serve as anti-friction bearings. The balls C cannot become casually displaced, nor are there any parts liable to get out of repair. When a wooden pulley or wheel is used, a piece of metal is inserted centrally in it, provided with a circular opening, $a$, and a groove, $b$, to receive the balls C.

I do not claim, broadly, the use of balls as an anti-friction medium; but,

Having thus described my invention, I claim as new and desire to secure by Letters Patent as an improved article of manufacture—

A pulley-block made with its wheel B grooved centrally, and provided with balls C, all as herein shown and described.

JOSEPH M. DRAKE.

Witnesses:
R. GAWLEY,
TIMOTHY SHINE.